UNITED STATES PATENT OFFICE.

JAMES S. PATTY, OF CHICAGO, ILLINOIS, ASSIGNOR TO THE OHIO VARNISH COMPANY, OF CLEVELAND, OHIO, A CORPORATION OF OHIO.

PAINT AND VARNISH REMOVER.

982,524. Specification of Letters Patent. Patented Jan. 24, 1911.

No Drawing. Application filed December 1, 1909. Serial No. 530,708.

*To all whom it may concern:*

Be it known that I, JAMES S. PATTY, a citizen of the United States, residing at Chicago, in the county of Cook and State of Illinois, have invented a certain new and useful Improvement in Paint and Varnish Removers, of which the following is a full, clear, and exact description, reference being had to the accompanying drawings.

The object of this invention is to provide a composition of matter for removing paint and varnish which shall possess great attacking qualities to rapidly reduce the paint or varnish to a condition allowing it to be washed off with water.

My composition, while effectively disintegrating and dissolving the paint or varnish, has no deleterious effect on the wood. Moreover, my composition does not injure the hands of the operator and it is less poisonous than many paint and varnish removers.

The composition consists of a phenolate in solution and associated with a solvent for the gums or constituents of the varnish or paint. When such a composition is applied to a varnished surface, for example, the phenolate disintegrates the gum of the varnish and the solvent referred to dissolves the destroyed gum. Such a solvent is employed that the resultant body is readily miscible with water, so that it may be washed from the surface. My composition acts with great rapidity, resulting in a comparatively small amount being lost by evaporation.

In making my composition, I prefer to use a phenolate of sodium or potassium. I put this in a substance which is a suitable solvent or carrier for the gum or paint, as alcohol. The phenolate, however, is not soluble in such substance, and to render it soluble I add to the vehicle a suitable alkali, as for example, a small quantity of aqua ammonia. This causes the phenolate to go into solution.

I have found the following to be satisfactory proportions, namely:—8 oz. of phenolate of sodium, ($C_6H_5NaO$;) 1 gal. alcohol, (grain, wood or denatured;) 2 oz. of aqua ammonia.

I prefer to place the phenolate in the alcohol, then add the ammonia thereto. If desired, acetone or benzol may be substituted for a part or all of the alcohol. Benzol being cheaper than alcohol, and a good solvent for varied gums, there is economy in substituting it for a portion of the alcohol.

When the composition described is applied to a painted or varnished surface, the phenolate at once attacks the gums or substances employed, disintegrating and destroying them, and thereupon the alcohol, either alone or with other substances used with it, dissolves the destroyed gum to such an extent that the whole mass may be readily washed off with water. By providing the caustic in the form of a phenolate, I find that it has a greater effect in attacking the gum with a less effect on the wood than when it is carried in any other way now known to me. In fact, the effect on the wood is practically *nil*, while the effect on the varnish gums is such that in a very few minutes they may be washed off with water. The phenolate disintegrates the gum with great rapidity and thereby enables the alcohol or other solvent to obtain a most thorough access to it.

Having thus described my invention, what I claim is:

1. A composition of matter for the purpose specified, comprising a phenolate of the sodium group, a gum solvent, and an alkali.

2. In a composition of matter consisting of a phenolate of potassium or sodium, alcohol and ammonia.

3. A composition of matter for the purpose specified, consisting of a phenolate of sodium or potassium, alcohol, benzol and ammonia.

4. A composition of matter for the purpose specified, consisting of a phenolate of sodium or potassium, alcohol, and ammonia in about the proportions specified.

In testimony whereof, I hereunto affix my signature in the presence of two witnesses.

JAMES S. PATTY.

Witnesses:
ALBERT H. BATES,
BRENNAN B. WEST.